United States
Bestenreiner et al.

[11] 3,893,856
[45] *July 8, 1975

[54] METHOD OF PRODUCING GEOMETRIC OPTICAL RASTERS

[75] Inventors: Friedrich Bestenreiner; Reinhold Deml, both of Munich, Germany

[73] Assignee: Agfa-Gevaert AG, Leverkusen, Germany

[*] Notice: The portion of the term of this patent subsequent to Nov. 27, 1990, has been disclaimed.

[22] Filed: Nov. 26, 1973

[21] Appl. No.: 418,818

Related U.S. Application Data

[63] Continuation-in-part of Ser. No. 830,073, June 3, 1969, Pat. No. 3,775,110.

[30] Foreign Application Priority Data

June 4, 1968    Germany.............................. 1772567

[52] U.S. Cl.................... 96/38.3; 96/27 R; 96/27 H; 96/81; 350/178
[51] Int. Cl. ........................ G03c 5/00; G03c 11/00
[58] Field of Search.......... 96/27 R, 27 E, 27 H, 45, 96/26, 81, 38.3, 116; 350/178

[56] References Cited
UNITED STATES PATENTS

| | | | |
|---|---|---|---|
| 2,763,551 | 9/1956 | Smith | 96/26 |
| 3,110,593 | 11/1963 | Yule | 96/45 |
| 3,284,208 | 11/1966 | Land | 96/118 |
| 3,504,970 | 4/1970 | Linden | 96/26 |
| 3,586,412 | 6/1971 | Leith | 96/27 H |
| 3,775,110 | 11/1973 | Bestenreiner et al. | 96/27 R |

*Primary Examiner*—Norman G. Torchin
*Assistant Examiner*—Edward C. Kimcin
*Attorney, Agent, or Firm*—Michael S. Striker

[57] ABSTRACT

Geometric optical rasters are produced by exposing selected areas of a layer of photosensitive material to an interference pattern which is obtained by splitting a ray of coherent light into a plurality of rays and deflecting and overlapping the plurality of rays. The exposing step may comprise directing light against the layer through several confined areas or apertures whose mutual distance is a whole multiple of a predetermined unit distance; subjecting the layer to the action of light which forms two groups of lines normal to each other and defining square interstices; directing light against the layer through at least one confined area, periodically varying the intensity of light and moving the layer at a constant speed relative to the confined area, or vice versa; or by directing light against the layer through at least one confined area, maintaining the intensity of light at a constant value and moving the layer at a periodically constant speed relative to the confined area, or vice versa. The layer is thereupon stabilized.

4 Claims, 7 Drawing Figures

METHOD OF PRODUCING GEOMETRIC OPTICAL RASTERS

CROSS-REFERENCE TO RELATED APPLICATION

This is a continuation-in-part of our copending application Ser. No. 830,073 filed June 3, 1969, now U.S. Pat. No. 3,775,110 granted Nov. 27, 1973.

BACKGROUND OF THE INVENTION

The present invention relates to a method of producing geometric optical rasters.

Hitherto, geometric optical rasters in the form of lenticular elements have been produced by hot-forming of synthetic plastic material, such as by stamping, liquid molding, and die-casting. The main difficulty encountered with these conventional methods is the production of a master form which, as regards its precision, has to meet all the requirements for the quality of discrete optical rasters.

The production of such a master form is even more difficult when a plurality of optical rasters have to be contained in a unit area. The expenses involved in connection with the production of such a master form are excessive when the size of the discrete rasters has to correspond with the dimension of an image point, as is the case with many modern lenticular lenses.

SUMMARY OF THE INVENTION

An object of the invention is to provide a method of producing geometric optical rasters which allows for accurate production of extremely delicate lenticular elements and which can be resorted to in mass-production of such parts.

The method of making a geometric optical raster in accordance with the present invention comprises exposing selected areas of a layer of photosensitive material to an interference pattern, and stabilizing the thus exposed layer.

Stabilizing the layer may include developing the layer, rehalogenating the layer, or developing the layer to impart thereto a grained profile.

Exposing the layer may comprise directing against the layer light through at least one confined area, periodically varying the intensity of light, and moving the confined area relative to the layer at a constant speed, or vice versa.

In accordance with another embodiment of the method, exposing the layer may comprise directing against the layer light through at least one confined area, maintaining the intensity of such light at a constant value, and moving the layer relative to the light at a periodically varying speed, or vice versa.

Still further, the exposing step may comprise directing against the layer light through several confined areas whose mutual distance is a whole multiple of a predetermined unit distance.

It is also within the purview of the invention to expose selected areas of the layer of photosensitive material to the interference pattern by subjecting the layer to the action of light which forms two groups of lines whereby the lines of one group are normal to the lines of the other group and define therewith square interstices.

The interference pattern may be obtained by forming a ray of coherent light, splitting the ray into a plurality of rays, and deflecting and overlapping the plurality of rays.

The above and other objects, features and advantages of the improved method will become apparent from the following detailed description when taken in conjunction with the accompanying drawing which shows, for the purposes of illustration only, certain embodiments of apparatus for the practice of our method.

DESCRIPTION OF THE PREFERRED EMBODIMENTS

Figure 1:
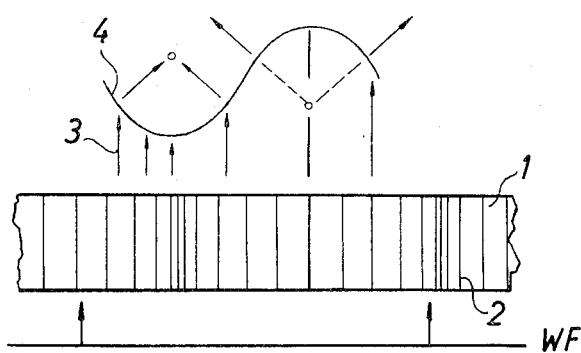
FIG. 1 illustrates the principle of deformation of a wavefront passing through a layer of photosensitive material.

FIG. 1 shows in section a contrast-free transparent layer 1 having uniform transparency in all parts thereof. As shown, the layer 1 comprises parallel lines 2 which extend at right angles thereto and are unequally spaced relative to one another to thereby indicate zones of different line density in the layer whereby the optical path length is determined on the basis of the local refraction index or the respective space variations of the lines 2. Impinging on the lower surface of layer 1 and passing therethrough is an optically flat wavefront WF. That part of this front which passes through the zone with a high line density is more delayed than that part of the wavefront which passes through the zone with a lower line density; this is due to the higher refraction index of the high-density zone. Consequently, and as indicated by arrows 3, the wave train 4 formed beyond the layer 1 is no longer optically flat but sinusoidal and, as shown, within a given distance from the layer, a real focussing is obtained in the area with a higher refractive index, which corresponds to the convex region of a lens, while a virtual focussing occurs in the area with an optically lower refractive index.

Figure 2:
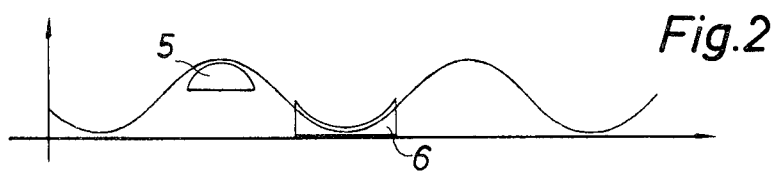
FIG. 2 shows an optically equivalent lenticular element in conventional form.

FIG. 2 illustrates lens configurations, which at a continuously constant refractive index, realize an optically constant effect. The optically lower refractive zones correspond to converging lenses 5 and the optically higher refractive zones correspond to diverging lenses 6. Premise for such an analogy of cylindrical or spherical lenses is that the path length relief is a periodical, throughout differentiable function of a local coordinate.

Such lenticular elements can now be produced by exposing a suitable emulsion carrier or layer with a very high dissolution to the superimposed image of two coherent rays. Such a double-ray interference pattern fundamentally has an intensity incidence perpendicular to the strip direction, expressed by $C \cdot (1 + \cos 2\pi Lx)$, in which $C$ is a constant, $L$ the spatial frequency (for example, the lines per millimeter) and $x$ the local coordinate. For the production of double-ray interference patterns, a biprism may, for example, be placed in the path of a source of monochromatic light while in the overlapping area of the two coherent rays the emulsion carrier is placed on a transport device operative to transport the carrier between exposure intervals transverse to the strip direction. Depending on the gradation pattern of the photographic layer and the subsequent chemical stabilizing or after-treatment, this function can now, distorted or undistorted, be reproduced as a variation of the optical path length. In order to obtain various intensity distributions, the periodic functions may also be determined on the basis of a Fourier analysis, superpositioning of which periodic functions produces the desired intensity distribution.

Figure 2A:
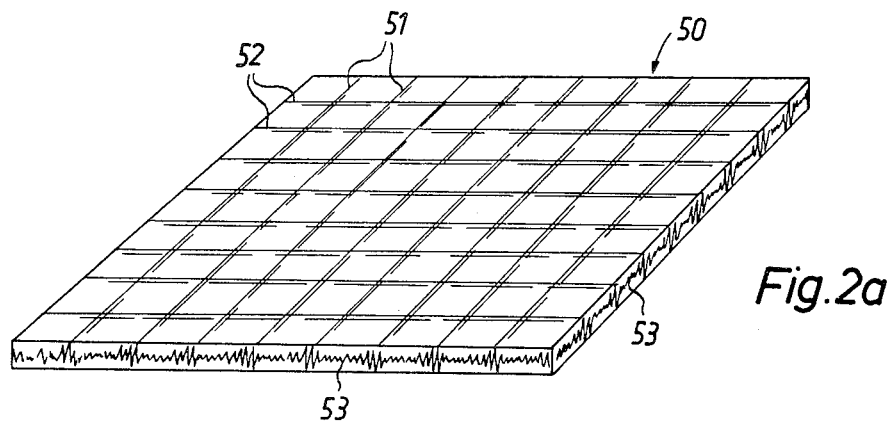
FIG. 2a shows a geometric optical raster which is obtained in accordance with our method by exposing a layer of photosensitive material to light which forms two groups of lines defining polygonal interstices.

As shown in FIG. 2a, a geometric optical raster 50 of spherical lenses may be produced by double exposure of an emulsion carrier (e.g., a layer of photosensitive material) with simple line gratings 51 and 52 which are normal to each other. If these simple line gratings have uneven intervals, it will be possible to produce rasters which have the effect of torical lenses.

The raster 50 of FIG. 2a is obtained by exposing a layer of photosensitive material to an interference pattern, including subjecting the layer to the action of light which forms two groups of lines whereby the lines of one group are normal to each other and define therewith square interstices. The lines which form the gratings 51 are exposed prior to the lines which form the gratings 52, or vice versa. The layer is thereupon stabilized. The curves 53 along the edge faces of the raster 50 indicate the refraction indices. Once bleached, the raster 50 is transparent throughout.

The interference pattern to which the layer which is to constitute the raster 50 is exposed is obtained by forming a ray of coherent light, splitting the ray into a plurality of rays, and deflecting and overlapping the plurality of rays.

Figure 3A:
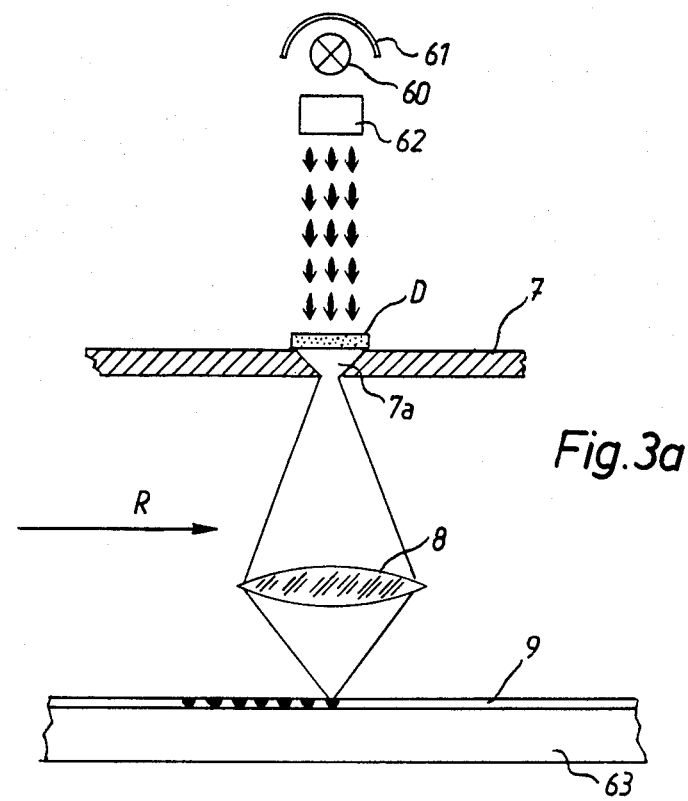
FIG. 3a illustrates an apparatus which can be used for the practice of one embodiment of the improved method.

An apparatus for the making of geometric optical rasters is shown in FIG. 3a. An aperture or confined area 7a in a plate 7 is exposed to light issuing from a source 60 located in front of a reflector 61 and behind a suitable modulator 62. The light which passes through the aperture 7a is focussed by an objective 8 onto a layer 9 of photosensitive material on a support 63. The plate 7 is movable relative to the layer 9 at a constant speed or vice versa. The reference character D denotes a diffusor which overlies the aperture 7a to insure a uniform illumination. The arrow R indicates the direction in which the plate 7 is moved at a constant speed.

The intensity of light issuing from the source 60 varies periodically. To this end, the apparatus of FIG. 3a may employ an inertialess lamp, such as a Xenon lamp with suitable light-intensity controls. The impulse and frequency of light impulses may be varied by means of a suitable generator. The apparatus can employ any gas discharge lamp which is operated with A.C. current or a conventional lamp combined with a modulator.

The interference pattern to which the layer 9 is exposed can be obtained in the same way as described in connection with FIG. 2a.

Figure 3B:
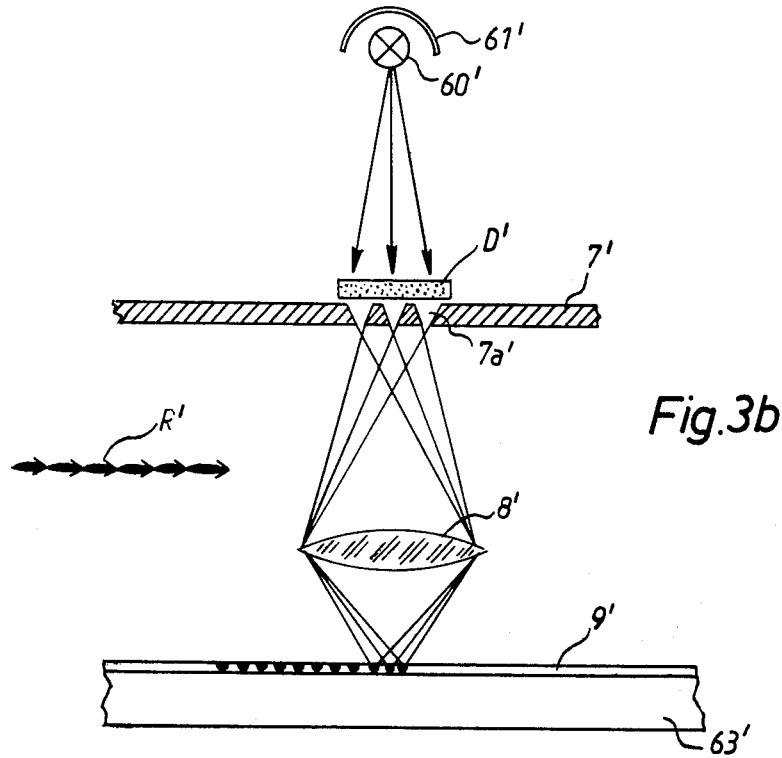
FIG. 3b illustrates a second apparatus.

FIG. 3b shows another apparatus wherein the plate 7' is moved at a periodically varying speed (see the arrow R') relative to the layer 9', or vice versa. The intensity of light issuing from the light source 60' is constant. Mechanisms for moving the plate 7' or the layer 9' at a periodically varying speed are known in the art. The objective is shown at 8', the reflector at 61', and the support for the layer 9' at 63'. The diffusor D' overlies several apertures 7a' of the plate 7'. The distance between the apertures 7a' is a whole multiple of a unit distance.

The dark spots of the layers 9 and 9' in FIGS. 3a and 3b represent the latent images. These spots do not appear during exposure of the layers 9 and 9', i.e., the refraction index of the layer 9 or 9' does not change during exposure to light.

Figure 4:
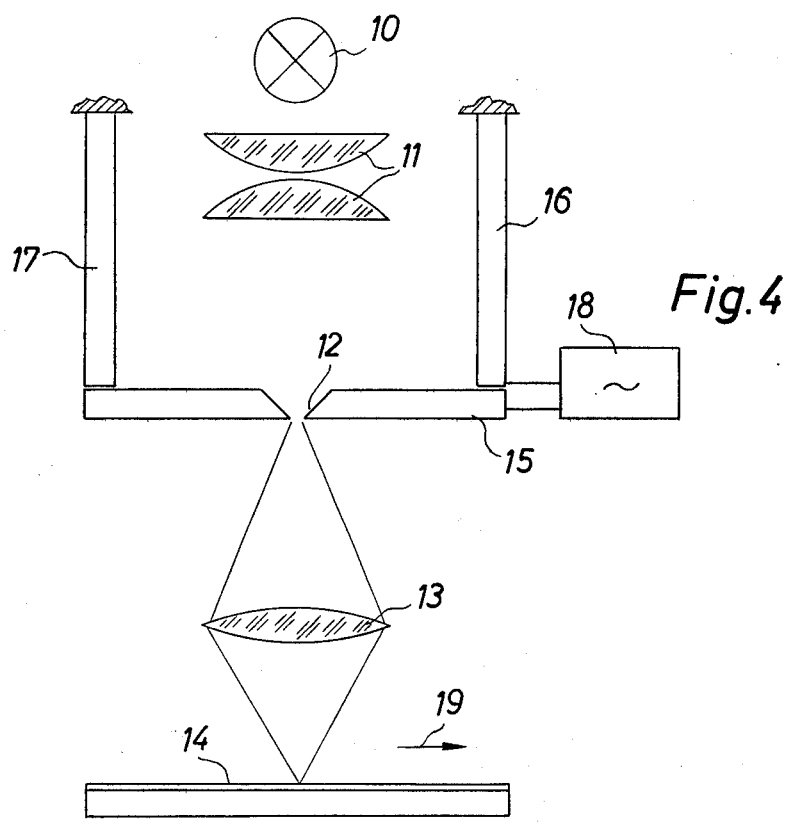
FIG. 4 shows a further apparatus for the exposure of a layer of photosensitive material.
Figure 5:
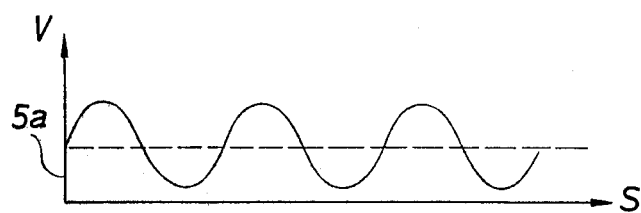
FIG. 5 is a diagram representing the relative speed and exposure intensity in the apparatus of FIG. 4.
Figure 5:
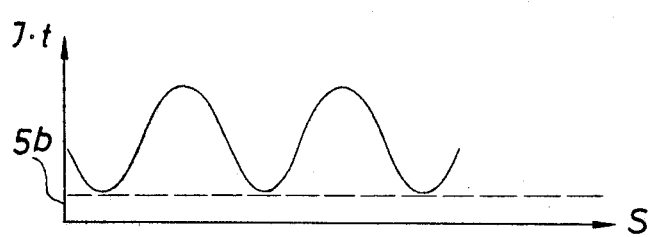

An alternative arrangement to produce a geometric optical raster in accordance with the method of our invention is shown in FIGS. 4 and 5. An aperture 12 is exposed to light issuing from a lamp 10 via condenser lenses 11 and is projected onto an emulsion carrier or layer 14 by means of an objective 13. A plate 15 having the aperture 12 is movable back and forth at right angles to the axis of the objective 13, and is connected to flexible supports 16 and 17. An oscillation generator 18 transmits to the plate 15 an actuating frequency. The emulsion carrier 14 is continuously shiftable in the direction of the arrow 19 and, to this end, may be placed on a slidable carriage, now shown. If, with the arrangement of FIG. 4, the speed of the emulsion carrier 14 is such that it corresponds to the maximum speed of the oscillating plate 15, which oscillates at a constant frequency and amplitude, a relative speed is obtained between the aperture image and the emulsion carrier 14, which speed periodically varies between zero and twice the maximum speed of the plate 15. As a result, a light quantity $I \cdot t$ results, graphically shown in the lower part of FIG. 5, which strikes the emulsion carrier and which periodically varies between a minimum and a maximum value. The minimum value results when the relative speed has its maximum value while the maximum value is obtained when the image of the aperture temporarily has the same speed and direction as the emulsion carrier. The duration of presence of the slit image on the emulsion carrier then has its maximum value.

The minimum quantity of the light which strikes the emulsion carrier does not influence the efficiency of the lenticular elements, this in view of the fact that only the contrast, that is the difference between the maximum and minimum value, is importance.

Instead of a single aperture, more apertures may also be arranged per unit area and in integral multiples thereof (see FIG. 3b) so as to shorten the exposure of a larger surface.

However, the number of lenticular elements produced as described hereinbefore, may also be multiplied by galvanically molding the outer relief, which defines the volume deformation of the layer. Such a galvanically produced form may thereafter be used for the deformation of, for example, plastic resins in order to manufacture rasters with the same profile.

The required chemical steps for the production of rasters such as development, rehalogenating, bleaching, and other after treatments are generally known and consequently are not further described.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the claims.

What is claimed as new and desired to be protected by Letters Patent is set forth in the appended claims.

We claim:

1. A method of producing a geometric optical raster which comprises the steps of forming a ray of coherent light; splitting said ray into a plurality of rays; deflecting and overlapping said plurality of rays to form an interference pattern; exposing selected areas of a layer of photosensitive material to said interference pattern, including directing light against said layer through at least one confined area, periodically varying the intensity of light, and effecting relative movement at a constant speed between said confined area and said layer; and stabilizing said layer.

2. A method of producing a geometric optical raster which comprises the steps of forming a ray of coherent light; splitting said ray into a plurality of rays; deflecting and overlapping said plurality or rays to form an interference pattern; exposing selected areas of a layer of photosensitive material to said interference pattern, including directing light against said layer through at least one confined area, maintaining the intensity of said light at a constant value, and effecting relative movement at a periodically varying speed between said light and said layer; and stabilizing said layer.

3. A method of producing a geometric optical raster which comprises the steps of forming a ray of coherent light; splitting said ray into a plurality of rays; deflecting and overlapping said plurality of rays to form an interference pattern; exposing selected areas of a layer of photosensitive material to said interference pattern, including directing light against said layer through a plurality of confined areas whose mutual distance is a whole multiple of a predetermined unit distance; and stabilizing said layer.

4. A method of producing a spherical geometric optical raster which comprises the steps of forming a ray of coherent light; splitting said ray into a plurality of rays; deflecting and overlapping said plurality of rays to form an interference pattern; exposing selected areas of a layer of photosensitive material to said interference pattern, including subjecting the layer to the action of light which forms two groups of lines, the lines of one group being normal to the lines of the other group and defining therewith square interstices; and stabilizing said layer.

* * * * *